Dec. 18, 1928.  
C. H. QUINN  
1,695,606  
PRESSURE AND TEMPERATURE CHANGE RESPONSIVE FURNACE CONTROL MEANS  
Filed Dec. 16, 1924    2 Sheets-Sheet 1

Inventor  
Charles H. Quinn  
By  
Attorney

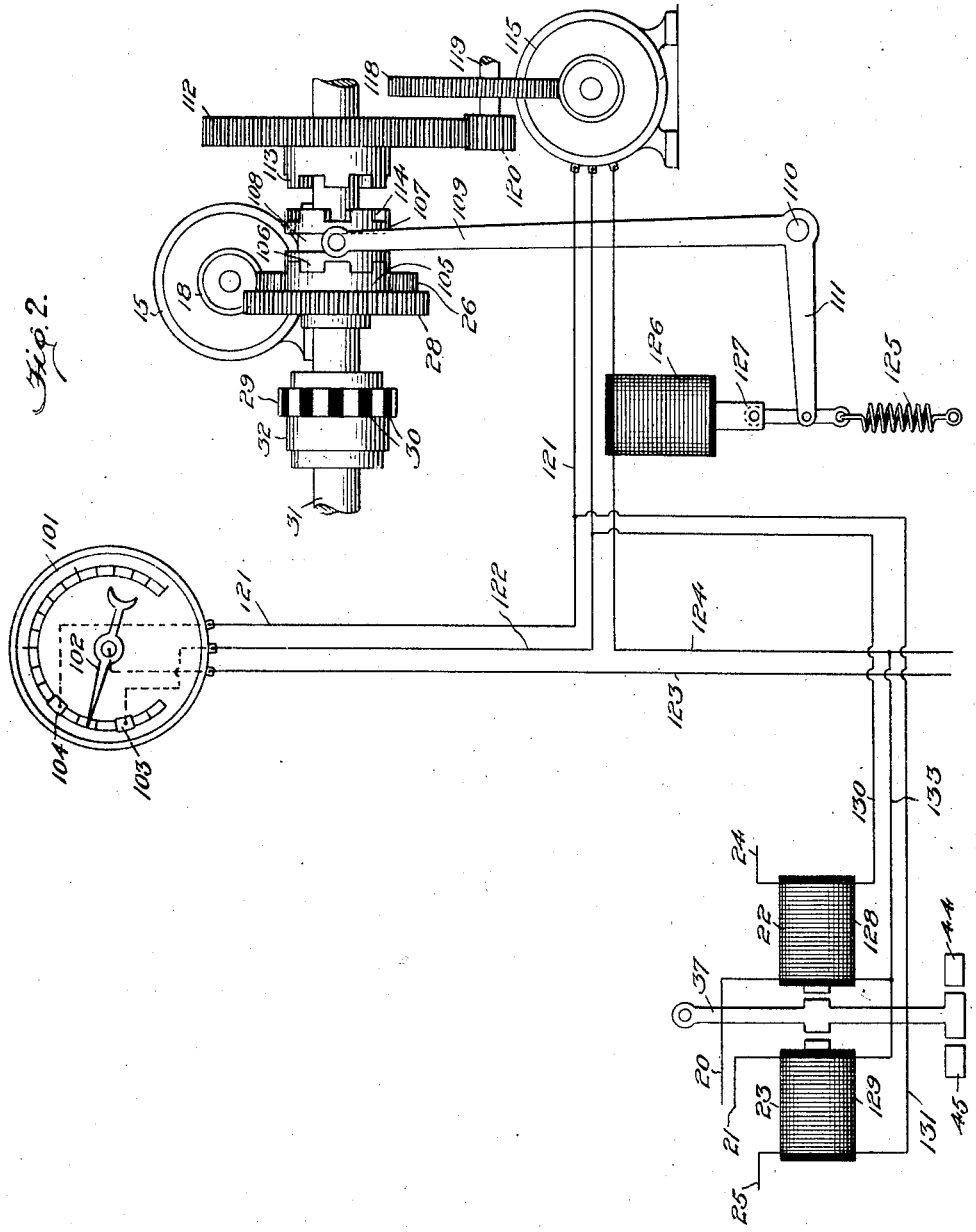

Patented Dec. 18, 1928.

1,695,606

UNITED STATES PATENT OFFICE.

CHARLES H. QUINN, OF SAN FRANCISCO, CALIFORNIA.

PRESSURE AND TEMPERATURE CHANGE RESPONSIVE FURNACE-CONTROL MEANS.

Application filed December 16, 1924. Serial No. 756,320.

The invention relates to automatic control means for heat generators of power, heating or other plants.

The primary object of the invention, generally stated, is to improve the control apparatus forming the subject-matter of my co-pending application, filed December 1st, 1924, Serial No. 753,306, wherein is disclosed an automatic control for the prime mover of a dynamo electric or other power plant including electrically operated means for successively throwing into or out of operation a battery of burners, fuel feeders or other mechanical means for regulating the heat generated by the furnace of the power plant, the control means being operated by means responsive to fluctuations in the current output from a generator driven by steam pressure in the furnace boiler, and acting to increase or decrease the feeding of fuel to the furnace in order that the current output from the generator may be kept constant.

However, in the use of the automatic electric control device, as disclosed in said application, it is conceivable that, owing to variations in circumstances, such as changes in the quality or nature of the fuel used, or the conditions existing in the combustion chamber, the heat resulting from the feeding or firing of a given amount of fuel as provided for by the automatic electric control means may be insufficient to generate all the power required or may be slightly excessive. In either event, the condition is indicated by or reflected in a slight increase or decrease in the steam pressure, depending upon whether there is more or less steam generated than will supply the demands of the prime mover.

It is with this contingency in view that I have devised the present invention which is a continuation, in part, of the above mentioned application, and which has for its object the provision of steam pressure or temperature responsive means in combination with or auxiliary to the fluctuation responsive means for operating the electric control means and acting independently thereof or adjunctly thereto.

An object of the invention is to provide thermal, pressure or similar responsive means in association with the furnace or boiler of a power or other plant acting automatically to control the operation of electric control means for governing the rate of fuel feed to the furnace.

A further object of the invention, more specifically stated, is to provide steam pressure responsive means for operating the electric control means for the fuel feeding mechanism, the pressure responsive means being, moreover, capable of effecting the operation of the electric control means in the event of failure of the fluctuation responsive means on account of variations in conditions, as above pointed out, or on account of total failure from any cause.

Another object of the invention is to provide a pressure responsive means associated with current fluctuation responsive means together with an automatic selector for rendering either means operative, depending upon conditions.

Still another object of the invention is to provide mechanism including a rotary member for controlling the operation of a series of fuel feeding devices, the rotary member being adapted to be driven by separate motor means energized respectively in accordance with fluctuations in the current and fluctuations in the steam pressure, electro-magnetically operated means being provided for selectively operatively connecting the motor means to the rotary member.

Another object of the invention is to provide a mechanism of this character which is entirely electrically operated, the pressure responsive means acting to close a selected circuit for effecting energization and operation of the control means.

To these and other ends, the invention comprises the various elements and combinations of elements to be hereinafter more fully described and pointed out in the appended claims.

In the drawings:

Figure 2 is an elevation at right angles to Figure 1 illustrating the mechanical features.

Figure 1:
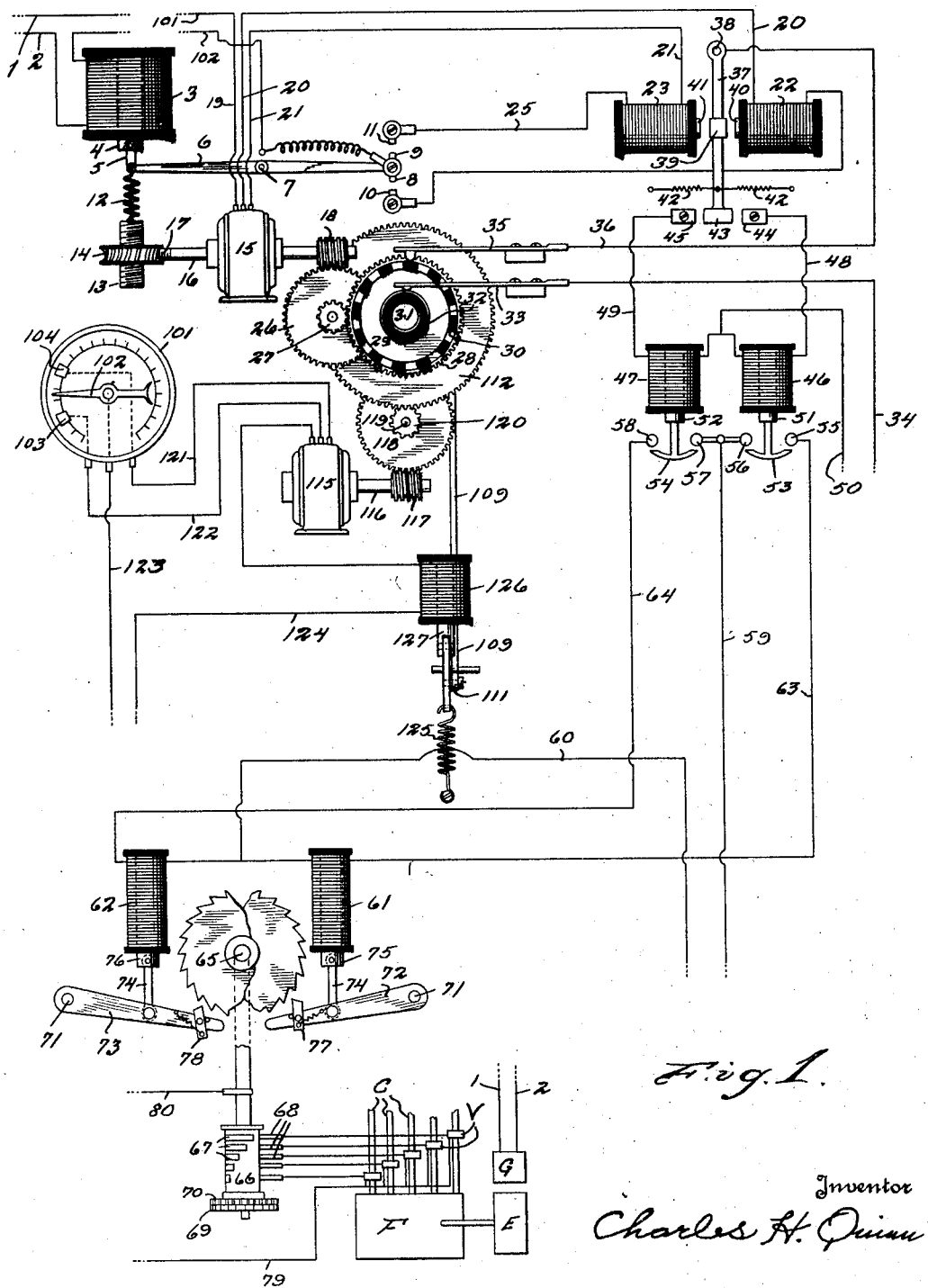
Figure 1 is a diagrammatic elevation of the pressure responsive mechanism in association with the electric control apparatus embodied in the above mentioned co-pending application.

Referring more particularly to the drawings, the numerals 1 and 2 designate the power lines or the bus-bars of the station. The numerals 101 and 102 represent the independent source of power actuating the motor 15 and its associated circuits. The numeral 3 indicates a solenoid which has its winding connected with the conductors 1 and 2 and which includes a movable core 4 pivotally connected by a link 5 or the like with one end of an arm 6 pivoted intermediate its ends, as at 7, and carrying oppositely extending contacts 8 and 9 adapted to be brought into engagement with stationary contacts 10 and 11, respectively, under certain circumstances, as will be explained. Connected with the first mentioned end of the arm 6, and consequently with the core 4, is a spring 12 connected, in turn, with a screw 13 having threaded engagement with a worm-wheel 14.

The apparatus further includes an electric motor 15 of any ordinary or preferred type having its shaft 16 threaded at one end to define a worm 17 meshing with the worm-wheel 14, and having its other end carrying a worm 18.

The motor 15 is of the reversible type and one of its terminals is connected by a conductor 19 with wire 101, while its other terminals are connected with conductors 20 and 21 connected with the terminals of electromagnets 22 and 23, respectively. The other terminals of these magnets are connected by conductors 24 and 25, respectively, with the contacts 10 and 11. It will be seen that by this means the motor will be energized to operate in one direction or the other, depending upon whether the contact 10 or 11 is engaged by the contact 8 or 9.

The spring 12 and the pull of the solenoid 3 are so related that there is normally a balanced condition maintaining the arm 6 in the intermediate position shown. Obviously, variations in the current flow through the conductors 1 and 2 will result in a corresponding variation in the magnetic pull of the solenoid 3 which will result in movement of the core 4 and consequent swinging of the arm 6. When the magnetic strength increases, the core will be drawn into the solenoid and the arm 6 will swing in such a way that the contact 8 will engage the contact 10, thus closing the circuit through the electro-magnet 22, through the conductor 20, and the motor for rotating the motor in such a direction that the screw 17 on its shaft will turn the worm-wheel 14 in such a direction as to move the screw 13 away from the solenoid 3 and increase the tension of the spring 12 so that the arm 6 will be restored to its neutral or intermediate position, whereupon the motor ceases to be energized. In case of a decrease in the magnetic strength of the solenoid 3, the tension of the spring 13 exceeds the pull on the core 4 and the arm 6 is moved in the reverse direction, the contact 9 engaging the contact 11 and closing the circuit through the magnet 23, conductor 21 and the motor for causing the motor to operate in the reverse direction so that the screw 17 on its shaft will turn the worm-wheel 14 in a direction opposite to that above indicated for moving the screw 13 toward the solenoid 3 and reducing the tension of the spring 12 so that the arm 6 may return to neutral in intermediate position, deenergizing the motor.

The rotation of the motor in either direction is taken advantage of in controlling an independent or relay circuit. In carrying out this feature I provide a worm-wheel 26 meshing with the worm 18 and carrying a pinion 27 meshing, in turn, with a gear 28 on a metallic drum 29 which has its periphery equipped with spaced strips or segments 30 of insulating material. Mounted upon and insulated from the shaft 31 of the drum is a collector ring 32 engaged by a spring or other contact 33 with which is connected one of the conductors 34 of an independent source of current. The drum 29 is likewise insulated from the shaft 31 but is in electrical connection with the ring 32. Cooperating with the drum 29 is a spring or other contact 35 with which is connected a wire 36 leading to a lever 37 pivoted at 38 and located between the electromagnets 22 and 23. This lever carries an armature 39 positioned between and adapted to be attracted by the pole pieces 40 and 41 of the magnets 22 and 23, respectively. This lever 27 is normally maintained in an intermediate or neutral position by means of suitable springs 42 extending from opposite sides thereof. On the lever is a contact 43 located between and adapted to be brought into engagement with either of contacts 44 and 45.

The independent circuit above referred to further includes a pair of solenoids 46 and 47 which have one terminal connected by conductors 48 and 49 with the contacts 44 and 45, respectively. The other conductor 50 of the independent source of current, not shown, is connected with the remaining terminals of both solenoids 46 and 47. These solenoids include movably mounted cores 51 and 52 carrying contacts 53 and 54, respectively, the former of which is adapted to engage and bridge contacts 55 and 56, and the latter of which is adapted to engage and bridge contacts 57 and 58.

The numerals 59 and 60 designate the terminals of still another independent source of current and the former is connected with both contacts 56 and 57 while the latter is connected with one terminal of each of a pair of solenoids 61 and 62. The other terminal of the solenoid 61 is connected by a conductor 63 with the contact 55, and the remaining terminal of the solenoid 62 is connected by a conductor 64 with the contact 58. Positioned between the solenoids 61 and 62 is the shaft 65 of a drum device, indicated diagrammatically at 66, which drum carries contact segments 67 adapted to engage contacts 68 connected with any suitable electromagnetically operated control devices for the burners or feed means of a furnace or the like constituting, forming part of, or operating the prime mover. This drum and the contacts associated therewith are shown for illustrative purposes only as there is no limitation as to the exact type of circuit control mechanism operated by movement of the shaft 65. The drum disclosed is well adapted for use in connection with my fuel feeding mechanism disclosed in the above mentioned co-pending application. The shaft 65 carries a pair of ratchets or segmental ratchets 69 and 70, the teeth of which face oppositely, as shown. Suitably pivoted, as at 71, are levers 72 and 73 connected by links 74, or their equivalent, with the cores 75 and 76 of the solenoids 61 and 62. These levers carry spring-pressed pawls 77 and 78 arranged to have limited movement and positioned to cooperate with the ratchets 69 and 70.

Variations in the current flow through the main line produce corresponding variations in the strength of the electromagnet 3 which will result in energization of the motor 15 in one direction or the other, as above explained. When the arm 6 is moved to engage either the contacts 8 or 9 with the contact 10 or 11, as the case may be, it is apparent that either the electromagnet 22 or 23 will be energized and this will result in attraction of the armature 39 and consequent movement of the lever 37 so that the contact 43 thereon will be brought into engagement with either the contact 44 or the contact 45. Any continuous rotation of the armature of the motor 15 must result in rotation of the drum 29 and intermittent engagement of the contact 35 with the metallic surfaces of the drum between the insulating strips 30. As one conductor 34 of the independent source is connected with the contact 33, current will pass from this contact, through the ring 32, drum 29, and at such time intervals when the contact 35 is in engagement with the metallic surfaces of the drum 29, the current will pass through the contact 35 and conductor 36 to the lever 37 and contact 43 carried thereby and thence through either the conductor 48 or 49 to and through the solenoid 46 or 47, as the case may be, and thence through the conductor 50 back to the source. The intermittent flow of current caused by engagement of the contact 35 with the successive metallic areas of the drum between the strips 30 and during operation of the motor 15, consequently causes corresponding intermittent energization of the solenoid 46 or 47, whichever is in use, and this intermittent flux will be reflected in the intermittent bridging and unbridging of the contacts 55 and 56 or 57 and 58, the circuit controlled by or in which these contacts are located being consequently intermittently opened and closed.

Whenever the contacts 55 and 56 are bridged, the solenoid 61 will be energized and will attract the core 75 so that the lever 72 will be moved, the pawl 77 thereon engaging the ratchet 69 and rotating the drum 66 one step. When the contacts 57 and 58 are bridged, the solenoid 62 is energized so that the core 76 thereof will be moved and the lever 73 correspondingly moved so that the pawl 78 thereon operating with the ratchet 70 will rotate the drum 66 in a reverse direction. It is understood that in the event the magnet valves 61 and 62 cannot consistently provide the energy necessary to rotate shaft 65 and drum 66 other magnets controlling air valves may be used to control pneumatic or other independent means of moving cylinder 66. It is preferable that the insulating strips 30 be so arranged with respect to the ratchet teeth that whenever the contact 35 engages the drum between the successive strips, the ratchet 69 or 70 as the case may be, will be turned to a corresponding extent for rotating the drum 66 accordingly.

Obviously, the movement of such a control drum as that illustrated in Figure 2 may be utilized for controlling fuel for internal combustion engines, gas or oil burners, pulverized fuel feeders, motors or engines operating stokers or any other devices for controlling or regulating a furnace F with boiler producing steam for the operation of an engine E driving the generator G of the plant, the generator supplying current through the conductors 1 and 2, above mentioned. For purposes of illustration, the furnace F is here represented as equipped with a plurality of feed conduits C within which are interposed control devices which might be electro-magnetically operated valves V of any ordinary or preferred type. These valves are not illustrated in detail as they form no part of the present invention and while the word "valve" is used it should be understood that it is employed only in a broad sense as it may be construed to refer to a damper, regulator, or motor driven or other feed device for any kind of fuel. The contacts 68 are connected with the electro-magnets or solenoids of the respective valves V, all of which have a common return conductor 79. The segments 67 are all connected with a conductor 80 and any suitable source of current may be provided for the conductors 79 and 80 for supplying the necessary power to effect operation of the valves. The segments 67 are shown as of progressively increasing lengths so that when the drum 66 is rotated properly, a greater or less number of the segments 67 will engage the contacts 68 for opening or closing a progressively increasing or decreasing number of the valves V in accordance with the rotation of the drum by the solenoid actuated pawl and ratchet mechanism above described.

Whenever there is any reduction in the current in the conductors 1 and 2, the magnetic pull exerted by the solenoid 3 is lessened and the spring 12 will operate to swing the arm 6 and bring the contact 9 into engagement with the contact 11, thus energizing the solenoid 23 while energizing the motor so that the armature thereof will run in such a direction that the drum 29 will so turn that the drum 66 rotated by the pawl and ratchet mechanism controlled by the solenoid devices, will reduce the number of segments 67 into engagement with the contacts 68, thus cutting down the number of open valves V and decreasing the amount of fuel fed to the furnace of the prime mover. Logically, this will result in decrease in the speed or power of the engine to correspond with the decrease in demand for electric power from generator G. The fuel feed is thus automatically decreased until the current in the conductors 1 and 2 is such that the magnetic pull of the solenoid 3 will balance the tension of the spring 12, whereupon the arm 6 will return to neutral position with the various control devices deenergized.

In case the current in the conductors 1 and 2 is increased due to additional load demand, the magnetic pull of the solenoid 3 is increased, whereupon the arm 6 is moved in the opposite direction for reversing the direction or rotation of the armature shaft and the direction of movement of the drum 29 so that the drum 66 rotated by the step by step pawl and ratchet mechanism, which is itself actuated as above described, will be such as to increase the number of segments 67 in engagement with the contacts 68, thereby cutting in the successive valves V in the furnace control mechanism corresponding to the magnitude of the increase in current flowing in circuit or bus-bars 1 and 2. In this way it will be apparent that the automatic regulation of and increase or decrease of amount of fuel necessary to meet varying load conditions in the power station bus-bars will be assured.

In carrying out the present invention I provide pressure or temperature responsive means for effecting rotation of the drum 29 of the electric control device in one direction or the other to operate the fuel feeding mechanism, the responsive means acting independently of the current fluctuation responsive means, and including a suitable device such as a steam gage or thermometer 101 preferably connected with the furnace boiler in the usual manner and having its hand or pointer 102 constituting a contact adapted to engage either of contacts 103 and 104 disposed at selected points on the dial of the gage, these points being the maximum and minimum limits of the permissible variation in the steam pressure. By this arrangement there is provided means for controlling electric circuits for operating mechanism to be described.

The gear 28 carries a clutch face 105 adapted to be engaged by a clutch face 106 on a shiftable collar or sleeve 107 splined or otherwise mounted on the shaft 31 for rotation therewith and longitudinal movement thereon. The collar or sleeve is preferably grooved at 108 for engagement with a shifting lever 109, here shown as of angular shape, pivoted at 110, and including a lateral arm 111. Rotatable upon and restrained from longitudinal movement on the shaft 31 is a gear 112 having a clutch face 113 adapted to be engaged by a clutch face 114 on the collar or sleeve 107 when the latter is shifted away from the gear 28.

For driving the gear 112, I provide a motor 115 of suitable type, power and speed, having its shaft 116 carrying a worm 117 meshing with a worm wheel 118 on a counter-shaft 119 which also carries a pinion 120 meshing with the gear 112. The motor 115 is of the reversible type and has one terminal connected by a conductor 121 with the contact 104 of the pressure responsive device, and another terminal connected by a conductor 122 with the contact 103 thereof. Conductors 123 and 124 from any suitable source of current are connected respectively with the pointer 102 and the remaining terminal of the motor 115. It will be apparent that no current flows to the motor 115 as long as the steam pressure is normal and the pointer 102 in a position intermediate the contacts 103 and 104.

The above described clutch mechanism constitutes a selector for rendering the proper motor driven member or gear 28 or 112 operative by effecting coupling thereof to the shaft 31. It it intended that the electric control device for the furnace fuel feeding means be normally acted upon and controlled by the current fluctuation responsive means including the motor 15 and its transmission to the shaft 31 and for this reason the shiftable clutch member or collar 107 is normally in such position that its face 106 engages the face 105 on the gear 28, and under such circumstances it is obvious that the shaft 31 and drum 29 will be under the direct control of the motor 15 of the fluctuation responsive mechanism. This normal position of the clutch member 107 may be maintained by a spring 125 connected with the lever arm 111.

For automatically shifting the member 107 out of driving engagement with the gear 28 and into driving relation to the gear 112 synchronously with energization of the motor 115 by the action of the pressure responsive circuit closer, I provide a solenoid 126 acting upon a slidable core or armature 127 connected with the lever arm 111 and having its winding interposed in the conductor 124, the solenoid being consequently in series with the motor 115.

As disclosed in the said co-pending application, the relay including the electromagnets 22 and 23 is associated with the motor 15, the terminals 20, 21, 24 and 25 of their windings being appropriately connected in the circuit controlled by the current fluctuation responsive mechanism. In order that this same relay may be operated when the clutch is shifted and the motor 115 energized, I provide the electro-magnets 22 and 23 with additional or separate windings 128 and 129, the former of which has one terminal connected by a conductor 130 with the conductor 122 and the latter of which has one terminal connected, by a conductor 131, with the conductor 121, the remaining terminals of both being connected by a common conductor 133 with the current feed conductor 124. By this arrangement it is evident that the windings 128 and 129 are in parallel with the motor 115, one electro-magnet being energized when the motor is energized for rotation of its armature in one direction, and the other being energized when the motor is reversed. The relay will consequently operate in the same or a corresponding manner regardless of whether the motor 15 or the motor 115 be energized.

In the operation, it will be seen that if the current fluctuation responsive mechanism should fail, from any cause, to actuate the electric control means, which failure would result in an increase or decrease in the boiler pressure, the indicator 102 of the pressure gage would engage either the contact 103 or 104. Assuming that these two contacts are located at the high and low limits, respectively, of the permissible variation in pressure, it will be seen that when the pointer 102 engages the contact 103, the circuit will be closed through the solenoid 126, the motor 115 and the electro-magnet winding 128. The pull of the solenoid 126 on its core or armature 127 causes swinging of the lever 109 and shifting of the clutch member 107 into engagement with the gear 112 for locking the latter to the shaft 31 so that the drum 29 will be rotated. The rotation of this drum, together with energization of the relay magnet, will then cause operation of the means for controlling the fuel feed so that the feed will be increased, and the steam pressure increased to such an extent that the pointer 102 disengages the contact 103, whereupon the circuit to the solenoid 126, motor 115 and magnet winding 128 will be broken, the spring 125 then acting to return the clutch member 107 to its normal position in engagement with the gear 28 so that the fuel feed mechanism will be again under the control of the current fluctuation responsive means.

If the steam pressure should increase to such an extent that the pointer 102 engages the contact 104, the circuit will be completed through the solenoid 126, or before, through the motor 115, but in a reverse direction to the above described flow, and through the magnet winding 129. The clutch is shifted as before and the drum 29 is again turned but in the reverse direction, and the action of the latter, together with energization of the magnet 23, will cause operation of the electric control means for the fuel feed, and result in a decrease in the feed until the steam pressure reaches normal and the pointer 102 disengages the contact 104. The circuit being then broken, the pressure responsive mechanism becomes inactive, though it remains always in potential condition ready for action.

It will be observed that in the foregoing description reference is made to the current output from the generator operated by a prime mover controlled by electrical means which regulates the supply of fuel. This reference is only for purpose of illustration as it is obvious that the invention is not necessarily used in association with a dynamo electric plant inasmuch as it is equally well adapted for use in connection with an ordinary heating plant, or a furnace system for any purpose and in a wide variety of arts. Furthermore, while the device is described as associated with a current fluctuation responsive mechanism it is equally true that it might be used absolutely independently thereof to control the feeding of fuel to furnaces provided for any purpose whatsoever. Another point is that the steam gage referred to is not intended to be a limitation as it is readily conceivable that it may be replaced by a temperature indicator such as one embodying a thermo-pile or the like, the only necessity being the employment of some mechanism which will be responsive to changes, for instance pressure, incident to changes in temperature. It should of course be understood that I reserve the right to make all such changes in the construction and arrangement of parts as will widen the field of utility of the invention and increase its adaptability, provided such variations and modifications constitute no departure from the scope of the appended claims.

Having now described my invention what I claim as new and desire to secure by Letters Patent, is:

1. The combination with an electric means for controlling the feeding of fuel to a furnace, of pressure controlled electrically operated means responsive to variations resulting from changes in the rate of fuel feeding to the furnace and to changes in the load on the furnace for operating the electric control means and correspondingly increasing or decreasing the fuel feed.

2. In combination with an electrical control device for regulating the feed of fuel to a furnace, pressure controlled electrically operated means responsive to variations in the conditions resulting from generation of heat in the furnace beyond a predetermined range only whereby to control the operation of the electrical control device for varying the rate of fuel feed to maintain a constant condition.

3. In combination with an electric control device for regulating the fuel feed to a furnace, a pressure controlled electrically operated means acting under the influence of changes in the furnace due to variation in the rate of fuel firing outside of a predetermined range for actuating the electric control means whereby to maintain a practically uniform condition.

4. In combination with an electric control device for regulating the feed of fuel to a furnace, a pressure controlled electro-mechanically operated device operatively associated with said electric control device and acting in accordance with the conditions in the furnace resulting from the burning of fuel therein for effecting operation thereof to vary the fuel feed and prevent variation of conditions beyond a predetermined range.

5. The combination with an electric control device for furnace fuel feeders, said control device being responsive to variations in an electric circuit supplied with current generated by means driven by the plant of which the furnace forms a part, of means responsive to variations in pressure in the boiler for operating the electric control device and varying the fuel feed whereby to maintain a substantially uniform pressure.

6. In combination with an electric control device for regulating the feeding of fuel to a furnace provided with a boiler, the control device including a current fluctuation responsive means, means responsive to variations in the pressure in the boiler for operating the electric control device independently of said fluctuation responsive means.

7. In an electric fuel feeding control mechanism for a furnace provided with a boiler, the combination with current fluctuation responsive means for actuating the electric control mechanism, of steam pressure responsive means susceptible to variations in the pressure in the boiler for actuating the electric control mechanism, and an automatic selector for throwing the fluctuation responsive means and the pressure responsive means selectively into operation.

8. In a furnace control apparatus including electric mechanism for regulating the feeding of fuel to the furnace provided with a boiler, current fluctuation responsive means and boiler pressure variation responsive means for operating the fuel feeding control mechanism, and means influenced by said pressure responsive means for selectively throwing the fluctuation responsive means and pressure responsive means into operation.

9. In a furnace control device, the combination of electric means for feeding fuel to the furnace including a rotary current distributing element, and pressure responsive means for controlling movement of said rotary element independently of actuation thereof by said electric means.

10. In a furnace and boiler control mechanism, the combination of electric means for regulating the feeding of fuel to the furnace, the electric means including a rotary distributor, and auxiliary electrically operated means responsive to changes in pressure in the boiler for controlling movement of said distributor and the circuits controlled thereby.

11. In a furnace fuel feeding control mechanism including a rotatable element, current fluctuation responsive means for normally controlling the rotation of said element, and associated boiler pressure variation responsive means for controlling said rotary element including means for rendering the first named means inactive.

12. In a furnace and boiler control mechanism including a rotary current distributor for energizing a battery of fuel feeding means, electric means responsive to variations in the current output of a generator driven by the plant of which the furnace and boiler form a part for effecting rotation of said current distributor to control the feeding of fuel in accordance with demands on said output, the combination of separate electrically operated means for effecting rotation of the said distributor, and means responsive to pressure variations in the boiler for selectively operatively connecting said electrically operated means or said pressure responsive means to the distributor.

In testimony whereof I affix my signature.

CHARLES H. QUINN.